(12) United States Patent
Takeda et al.

(10) Patent No.: US 11,516,787 B2
(45) Date of Patent: Nov. 29, 2022

(54) USER TERMINAL, BASE STATION APPARATUS, AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Qin Mu, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/634,324

(22) PCT Filed: Jul. 28, 2017

(86) PCT No.: PCT/JP2017/027572
§ 371 (c)(1),
(2) Date: Jan. 27, 2020

(87) PCT Pub. No.: WO2019/021488
PCT Pub. Date: Jan. 31, 2019

(65) Prior Publication Data
US 2020/0163062 A1 May 21, 2020

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04W 8/24* (2013.01); *H04W 48/12* (2013.01)

(58) Field of Classification Search
CPC ....... H04W 72/04; H04W 48/12; H04W 8/24; H04W 72/042; H04L 5/0053
See application file for complete search history.

(56) References Cited

U.S. PATENT DOCUMENTS

2011/0236814 A1* 9/2011 Fukushima ............ G03G 9/113
430/105
2014/0241310 A1* 8/2014 Guan ................... H04L 5/0053
370/330
(Continued)

FOREIGN PATENT DOCUMENTS

WO 2014181673 A1 11/2014

OTHER PUBLICATIONS

Seungmin Lee, et al., U.S. Appl. No. 62/500,492, "Reception of Short & Long TTI with Limited Capability in V2X", filed May 2, 2017.*
(Continued)

*Primary Examiner* — Ayaz R Sheikh
*Assistant Examiner* — Debebe A Asefa
(74) *Attorney, Agent, or Firm* — Osha Bergman Watanabe & Burton LLP

(57) ABSTRACT

To appropriately communicate a control channel even when communication is performed by applying a configuration of the control channel different from those of legacy LTE systems, a user terminal according to the present invention includes: a reception section that receives a downlink control channel transmitted by each of a plurality of control resource sets; and a control section that controls monitoring of a downlink control channel candidate, and the control section controls allocation of a number of downlink control channel candidates to each of the control resource sets assuming that the number of downlink control channel candidates configured to a combination of the control resource sets in a given time unit does not exceed terminal capability.

5 Claims, 13 Drawing Sheets

(51) Int. Cl.
H04W 8/24 (2009.01)
H04W 48/12 (2009.01)

(56) References Cited

U.S. PATENT DOCUMENTS

| 2016/0044649 | A1* | 2/2016 | Frenne | H04L 5/006 |
| | | | | 370/329 |
| 2016/0088537 | A1 | 3/2016 | Uchino et al. | |
| 2021/0136823 | A1* | 5/2021 | Kim | H04W 74/008 |
| 2021/0167890 | A1* | 6/2021 | Lee | H04L 1/0038 |

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010.

3GPP TSG RAN WG1 NR Ad Hoc Meeting; R1-1709952; "Search space design" Huawei, HiSilicon; Qingdao, China; Jun. 27-30, 2017 (6 pages).

3GPP TSG RAN WG1 NR Ad-Hoc #2; R1-1711754; "WF on NR PDCCH Blind decodes" Vivo, Samsung; Qingdao, P.R. China; Jun. 27-30, 2017 (2 pages).

International Search Report issued in International Application No. PCT/JP2017/027572, dated Oct. 17, 2017 (4 pages).

Written Opinion issued in International Application No. PCT/JP2017/027572; dated Oct. 17, 2017 (3 pages).

Extended European Search Report issued in counterpart European Patent Application No. 17919433.7, dated Feb. 2, 2021 (9 pages).

MCC Support; "Draft Report of 3GPP TSG RAN WG1 #AH_NR2 v0.1.0 (Qingdao, China, Jun. 27-30, 2017)"; 3GPP TSG RAN WG1 Meeting #90, R1-171xxxx; Prague, Czech Rep; Aug. 21-25, 2017 (105 pages).

Office Action in counterpart Chilean Patent Application No. 202000223 dated Jun. 15, 2021 (22 pages).

CATT; "PDCCH blind decoding in LTE-A"; 3GPP TSG RAN WG1 Meeting #60, R1-100874; San Francisco, USA; Feb. 22-26, 2010 (5 pages).

Office Action in counterpart Japanese Patent Application No. 2019-532348 dated Sep. 21, 2021 (6 pages).

Huawei, HiSilicon; "UE procedure of PDCCH monitoring for URLLC"; 3GPP TSG RAN WG1 Ad hoc Meeting, R1-1709993; Qingdao, China; Jun. 27-30, 2017 (3 pages).

Office Action issued in the counterpart Chinese Patent Application No. 201780095221.3, dated Mar. 23, 2022 (12 pages).

Office Action issued in the counterpart Australian Patent Application No. 2017425066, dated Jun. 16, 2022 (3 pages).

MCC Support; "Final Report of 3GPP TSG RAN WG1 #AH_NR2 v1.0.0 (Qingdao, China, Jun. 27-30, 2017)" 3GPP TSG RAN WG1 Meeting #90, R1-1712032; Prague, Czech Rep; Aug. 21-25, 2017 (109 pages).

Office Action issued in the counterpart Indian Patent Application No. 202037003788, dated Mar. 16, 2022 (6 pages).

* cited by examiner

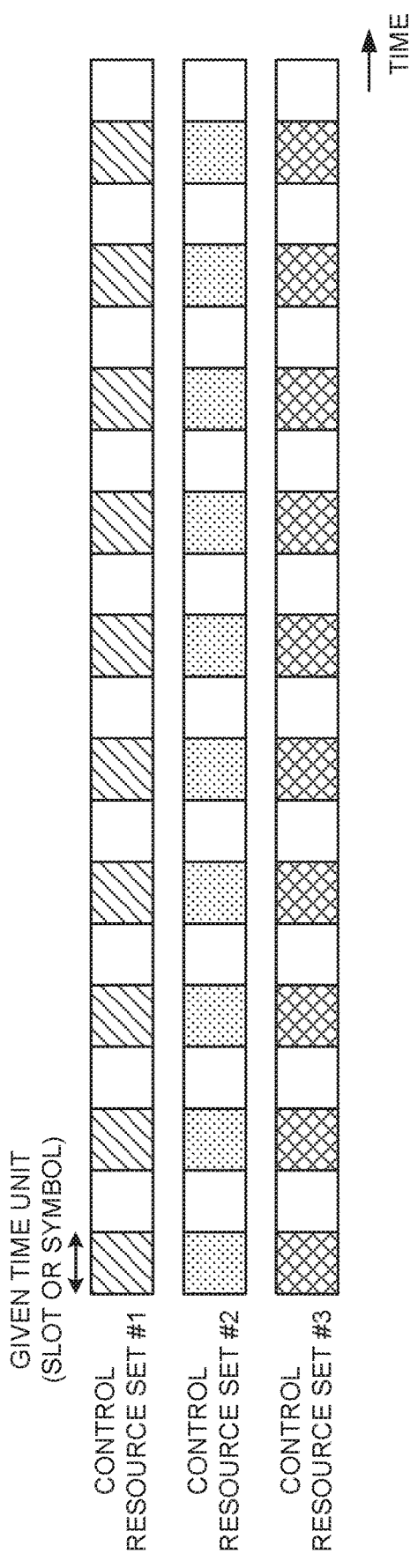
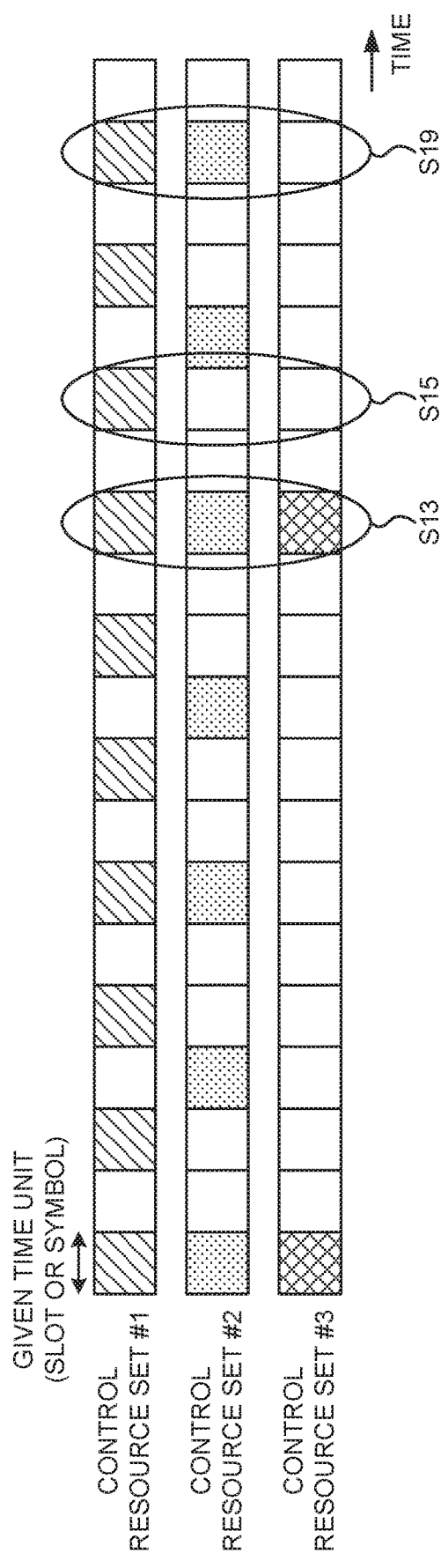

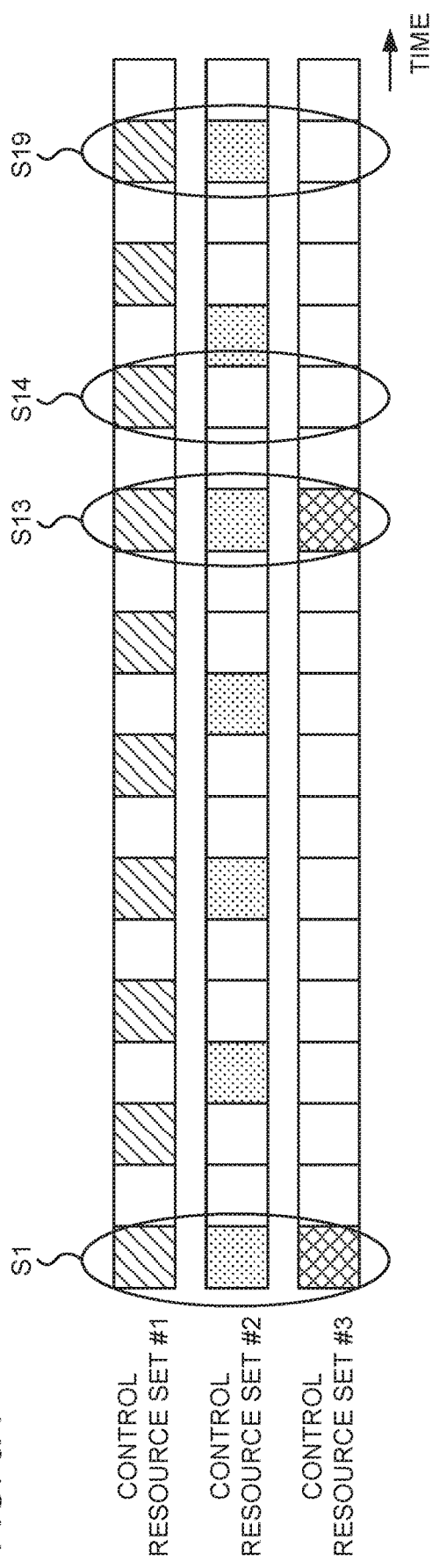

| | CONTROL RESOURCE SET #1 | CONTROL RESOURCE SET #2 | CONTROL RESOURCE SET #3 | CONTROL RESOURCE SET #1 + #2 | CONTROL RESOURCE SET #1 + #3 | CONTROL RESOURCE SET #2 + #3 | CONTROL RESOURCE SET #1 + #2 + #3 |
|---|---|---|---|---|---|---|---|
| BD OF CONTROL RESOURCE SET #1 | M | - | - | M | M | - | M |
| BD OF CONTROL RESOURCE SET #2 | - | N | - | N | - | N | N |
| BD OF CONTROL RESOURCE SET #3 | - | - | K | - | K | K | K |
| MAXIMUM BD | M < Max_UE | N < Max_UE | K < Max_UE | M+N < Max_UE | M+K < Max_UE | N+K < Max_UE | M+N+K > Max_UE |

DIFFERENT CONTROL RESOURCE SET MONITORING CASE

FIG. 4

|  | CONTROL RESOURCE SET #1 | CONTROL RESOURCE SET #2 | CONTROL RESOURCE SET #3 | CONTROL RESOURCE SET #1 + #2 | CONTROL RESOURCE SET #1 + #3 | CONTROL RESOURCE SET #2 + #3 | CONTROL RESOURCE SET #1 + #2 + #3 |
|---|---|---|---|---|---|---|---|
| BD OF CONTROL RESOURCE SET #1 | M | - | - | M | M | - | M→DROP |
| BD OF CONTROL RESOURCE SET #2 | - | N | - | N | - | N | N |
| BD OF CONTROL RESOURCE SET #3 | - | - | K | - | K | K | K |
| MAXIMUM BD | M < Max_UE | N < Max_UE | K < Max_UE | M+N < Max_UE | M+K < Max_UE | N+K < Max_UE | M+N+K > Max_UE |

DIFFERENT CONTROL RESOURCE SET MONITORING CASE

FIG. 5

|  | DIFFERENT CONTROL RESOURCE SET MONITORING CASE ||||||||
|  | CONTROL RESOURCE SET #1 | CONTROL RESOURCE SET #2 | CONTROL RESOURCE SET #3 | CONTROL RESOURCE SET #1 + #2 | CONTROL RESOURCE SET #1 + #3 | CONTROL RESOURCE SET #2 + #3 | CONTROL RESOURCE SET #1 + #2 + #3 |
| --- | --- | --- | --- | --- | --- | --- | --- |
| BD OF CONTROL RESOURCE SET #1 | M+X | - | - | M+X | M+X | - | M |
| BD OF CONTROL RESOURCE SET #2 | - | N+Y | - | N+Y | - | N+U | N |
| BD OF CONTROL RESOURCE SET #3 | - | - | K+Z | - | K+Z | K+Z | K |
| MAXIMUM BD | M+X | N+Y | K+Z | M+N+X+Y | M+K+X+Z | N+K+Y+Z | M+N+K |

FIG. 7

USER TERMINAL, BASE STATION APPARATUS, AND RADIO COMMUNICATION METHOD

TECHNICAL FIELD

The present invention relates to a user terminal, a base station apparatus and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE (also referred to as LTE Rel. 8 or 9), LTE-Advanced (LTE-A that is also referred to as LTE Rel. 10, 11 or 12) has been specified, and LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 13, 14, 15 or subsequent releases) have been also studied.

Legacy LTE systems (e.g., LTE Rel. 8 to 13) perform communication on Downlink (DL) and/or Uplink (UL) by using a subframe (also referred to as a TTI: Transmission Time Interval) of 1 ms. This subframe is a transmission time unit of 1 channel-coded data packet, and is a processing unit of scheduling, link adaptation or retransmission control (HARQ: Hybrid Automatic Repeat reQuest).

A radio base station controls data allocation (scheduling) for a user terminal, and notifies the user terminal of data scheduling by using DL control information (DCI: Downlink Control Information). The user terminal monitors and performs reception processing (demodulation and decoding processing) on a downlink control channel (PDCCH) on which the downlink control information is transmitted, and controls reception of DL data and/or transmission of uplink data based on the received downlink control information.

Transmission of a downlink control channel (PDCCH/EPDCCH) is controlled by using an aggregation of 1 or a plurality of Control Channel Elements (CCEs/Enhanced Control Channel Elements (ECCEs)). Furthermore, each control channel element includes a plurality of Resource Element Groups (REGs/Enhanced Resource Element Groups (EREGs)). The resource element groups are used, too, when a control channel is mapped on a Resource Element (RE).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Future radio communication systems (e.g., LTE Rel. 14, 15 and subsequent releases, 5G and NR) are assumed to control scheduling of data by a different configuration from those of legacy LTE systems (e.g., LTE Rel. 13 or prior releases). More specifically, the future radio communication systems are demanded to support flexible use of numerologies and a frequency, and realize a dynamic frame configuration. The numerologies refer to, for example, communication parameters (e.g., a subcarrier-spacing and a bandwidth) to be applied to transmission and reception of a certain signal.

Furthermore, it has been studied for the future radio communication systems to use for, for example, a control channel a different configuration from those of the legacy LTE systems. In this case, there is a risk that, when transmission and/or reception of a downlink control channel are controlled similar to the legacy LTE systems, it is not possible to appropriately perform communication.

The present invention has been made in light of this point, and one of objects of the present invention is to provide a user terminal, a base station apparatus and a radio communication method that can appropriately communicate a control channel even when communication is performed by applying a configuration of the control channel different from those of legacy LTE systems.

Solution to Problem

A user terminal according to one aspect of the present invention includes: a reception section that receives a downlink control channel transmitted by each of a plurality of control resource sets; and a control section that controls monitoring of a downlink control channel candidate, and the control section controls allocation of a number of downlink control channel candidates to each of the control resource sets assuming that the number of downlink control channel candidates configured to a combination of the control resource sets in a given time unit does not exceed terminal capability.

Advantageous Effects of Invention

According to the present invention, it is possible to appropriately communicate a control channel even when communication is performed by applying a configuration of the control channel different from those of legacy LTE systems.

BRIEF DESCRIPTION OF DRAWINGS

FIG. 2A is a diagram illustrating a control resource set to which an identical monitoring periodicity has been configured, and FIG. 2B is a diagram illustrating a control resource set to which a different monitoring periodicity has been configured.

FIG. 3A is a diagram illustrating three control resource sets of different monitoring periodicities, and FIG. 3B is a diagram illustrating configuration patterns of the numbers of downlink control channel candidates according to a first embodiment (first aspect).

FIG. 4 is a diagram illustrating configuration patterns of the numbers of downlink control channel candidates according to the first embodiment (second aspect).

FIG. 5 is a diagram illustrating configuration patterns of the numbers of downlink control channel candidates according to the first embodiment (third aspect).

FIG. 7 is a diagram illustrating configuration patterns of the numbers of downlink control channel candidates according to the second embodiment (second aspect).

DESCRIPTION OF EMBODIMENTS

Figure 1B:
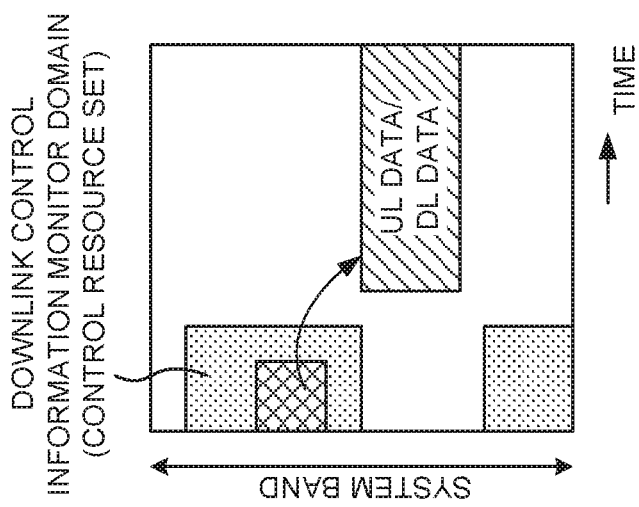
FIGS. 1A and 1B are diagrams illustrating one example of downlink control channels of legacy LTE and a future radio communication system.

In legacy LTE systems, a radio base station transmits Downlink Control Information (DCI) by using a downlink control channel (e.g., a Physical downlink Control Channel (PDCCH) or an Enhanced PDCCH (EPDCCH)) to a UE. Transmission of the downlink control information may be read as transmission of a downlink control channel.

The DCI may be scheduling information including at least one of, for example, information indicating time/frequency resources for scheduling data, information indicating a transport block size, information indicating a data modulation scheme, information indicating an HARQ process identifier, and information related to a demodulation RS. The DCI for scheduling DL data reception and/or measurement of a DL reference signal may be referred to as a DL assignment or a DL grant, and the DCI for scheduling UL data transmission and/or transmission of a UL sounding (measurement) signal may be referred to as a UL grant.

The DL assignment and/or the UL grant may include information related to a resource, a sequence or a transmission format of a channel for transmitting a UL control signal (UCI: Uplink Control Information) such as HARQ-ACK feedback for DL data or channel measurement information (CSI: Channel State Information). Furthermore, the DCI for scheduling the UL control signal (UCI: Uplink Control Information) may be specified separately from the DL assignment and the UL grant. Which DCI of the DL assignment, the UL grant or UCI scheduling the DCI is may be decided based on which value a value of a specific bit field included in the DCI is, may be decided based on which one of a plurality of given values a DCI payload size is, or may be decided based on in which resource domain the DCI has been detected assuming that each DCI is mapped in a different resource domain in advance.

The UE is configured to monitor a set of a given number of downlink control channel candidates in a given time unit (e.g., subframe). In this regard, monitoring refers to, for example, trying to decode the set of each downlink control channel of a target DCI format. This decoding will be also referred to as Blind Decoding (BD) or blind detection. The downlink control channel candidate will be also referred to as a BD candidate or an (E)PDCCH candidate.

The downlink control channel candidate set (a plurality of downlink control channel candidates) that needs to be monitored will be also referred to as a search space. A base station arranges DCI on given downlink control channel candidates included in the search space. The UE blind-decodes one or more candidate resources in the search space, and detects DCI of the UE. The search space may be configured by a user-common higher layer signaling, or may be configured by a user-specific higher layer signaling. Furthermore, two or more search spaces may be configured to the user terminal on the same carrier.

Legacy LTE specifies a plurality of types of Aggregation Levels (ALs) for the search space for a purpose of link adaptation. The AL corresponds to the number of Control Channel Elements (CCEs)/Enhanced Control Channel Elements (ECCEs) that compose DCI. Furthermore, the search space is configured to include a plurality of downlink control channel candidates for a certain AL. Each downlink control channel candidate includes one or more resource units (the CCEs and/or the ECCEs).

A Cyclic Redundancy Check (CRC) bit is attached to the DCI. This CRC is masked (scrambled) by a UE-specific identifier (e.g., C-RNTI: Cell-Radio Network Temporary Identifier) or a system-common identifier. The UE can detect the DCI whose CRC has been scrambled by a C-RNTI associated with an own terminal, and the DCI whose CRC has been scrambled by the system-common identifier.

Furthermore, the search space includes a common search space that is commonly configured to UEs, and a UE-specific search space that is configured per UE. In the UE-specific search space of a PDCCH according to legacy LTE, the AL (=the number of CCEs) is 1, 2, 4 and 8. The number of BD candidates is specified as 6, 6, 2 and 2 for AL=1, 2, 4 and 8, respectively.

Figure 1A:
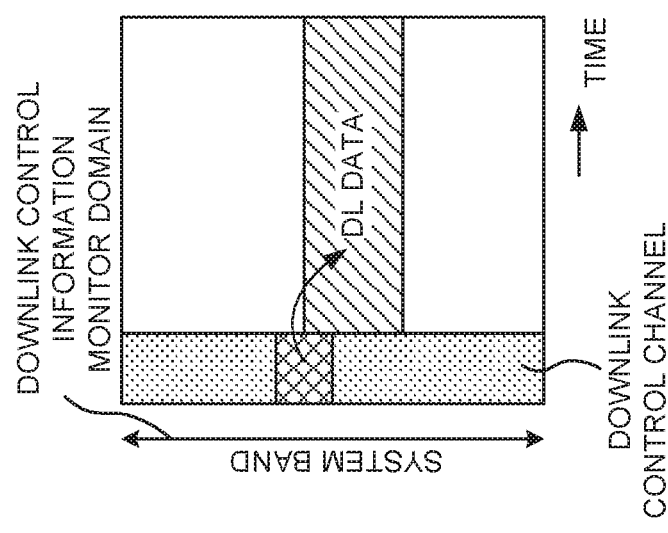

In legacy LTE systems, a downlink control channel (or downlink control information) is transmitted by using an entire system bandwidth (see FIG. 1A). Hence, the UE needs to monitor the entire system bandwidth and receive (blind-decode) the downlink control information irrespectively of whether or not DL data is allocated in each subframe.

By contrast with this, it is considered that the future radio communication systems do not perform communication by using the entire system band on a given carrier at all times, but dynamically or semi-statically configure a given frequency-domain (also referred to as a frequency band) based on communication use and/or communication environment, and control communication. For example, it is considered that the future radio communication systems do not necessarily allocate downlink control information for a certain UE to the entire system band and transmit the downlink control information, but configure a given frequency-domain and control transmission of the downlink control information (see FIG. 1B).

A radio resource including the given frequency-domain and time-domain (e.g., 1 OFDM symbol and 2 OFDM symbols) configured to the UE will be referred to as a CORESET (control resource set), a control resource set, a control subband, a search space set, a search space resource set, a control domain, a controlling subband or an NR-PDCCH domain.

The control resource set is configured in a given resource unit, and can be configured to a system bandwidth (carrier bandwidth) or a maximum bandwidth or less on which the user terminal can perform reception processing. For example, the control resource set can be composed of 1 or a plurality of RBs (PRBs and/or VRBs) in a frequency direction. In this regard, the RB means, for example, a frequency resource block unit including 12 subcarriers. The UE can monitor downlink control information within a range of the control resource set, and control reception of the downlink control information. Consequently, the UE does not need to monitor the entire system bandwidth at all times during reception processing of the downlink control information, and reduce power consumption.

Furthermore, the control resource set is a frame of a resource on which the downlink control information is mapped, or a time resource and/or a frequency resource in which the NR-PDCCH is arranged. Furthermore, the control resource set can be defined based on a resource unit size. For example, a size of one control resource set can be configured to a size that is an integer multiple of the resource unit size. Furthermore, the control resource set may be composed of contiguous or non-contiguous resource units.

The resource unit is a resource unit to be allocated to the NR-PDCCH, and may be one of a PRB, a PRB pair, an NR-CCE, an NR-REG and an NR-REG group.

Hereinafter, it is assumed that a plurality of control resource sets are configured to one UE, and a monitoring periodicity is configured to each control resource set. A case is assumed where the monitoring periodicity configured to each control resource set is identical or different between control resource sets. The UE performs blind decoding based on the monitoring periodicity configured per control resource set. Under this assumption, it is necessary to study how the number of times of blind decoding needs to be allocated between the control resource sets to optimize.

FIGS. 2A and 2B illustrate three control resource sets. FIG. 2A illustrates a state where the monitoring periodicities of all control resource sets (CORESETs #1 to #3) are configured to 2 slots (or 2 symbols). When the identical monitoring periodicity is configured to all control resource sets (CORESETs #1 to #3) as illustrated in FIG. 2A, the number of downlink control channel candidates (the number of times of blind decoding) becomes uniform in all slots that are monitoring occasions.

On the other hand, FIG. 2B illustrates a state where different monitoring periodicities are configured between the three control resource sets (CORESETs #1 to #3). While there is a slot S13 in which the identical slot is a monitoring occasion between the three control resource sets (CORESETs #1 to #3), there are slots S15 and S19 that become monitoring occasions in one or two control resource sets. When different monitoring periodicities are configured between the control resource sets (CORESETs #1 to #3) as illustrated in FIG. 2B, the number of downlink control channel candidates (the number of times of blind decoding) fluctuates per slot that is a monitoring occasion.

Hence, the inventors of this application have focused on that the number of control resource sets configured per given time unit (e.g., a slot, a symbol and a subframe) is changeable, and make a maximum value of a total of the numbers of downlink control channel candidates to be monitored in the given unit a given value or less irrespectively of the number of control resource sets configured in the given time unit.

Embodiments according to the present invention will be described in detail below with reference to the drawings. A radio communication method according to each embodiment may be each applied alone or may be applied in combination.

First Embodiment

The first embodiment is a user terminal that includes: a reception section that receives a downlink control channel transmitted by each of a plurality of control resource sets; and a control section that controls monitoring of a downlink control channel candidate, and the user terminal configures the number of downlink control channel candidates in a given time unit (e.g., slot) to a combination of control resource sets, and performs control such that the number of downlink control channel candidates is allocated to each of the control resource sets such that the number of downlink control channel candidates does not exceed a given value per combination of the control resource sets.

For example, a case will be assumed where a plurality of control resource sets having a monitoring periodicity are configured to the UE. A maximum value of the number of downlink control channel candidates (the number of times of blind decoding) to be monitored in the given time unit is configured to a combination of control resource sets including the individual control resource sets. Furthermore, allocation of the number of downlink control channel candidates to each control resource set is configured per combination of the control resource sets. In the following description, the number of downlink control channel candidates to be allocated to each control resource set will be referred to as a setting value. The number of downlink control channel candidates in the given time unit configured to the combination of control resource sets is the above maximum value or setting value.

In addition, a downlink control channel candidate set (a plurality of downlink control channel candidates) that needs to be monitored will be also referred to as a search space. Furthermore, the search space is specified by an aggregation level indicating the numbers of Control Channel Elements (CCEs)/Enhanced Control Channel Elements (ECCEs) that compose DCI. Hence, the control resource set to which the number of downlink control channel candidates (the number of times of blind decoding) is configured can be paraphrased as the search space or the aggregation level.

Consequently, even when a plurality of control resource sets of different monitoring periodicities are configured to the UE, and monitoring occasions (e.g., slots) of a plurality of control resource sets overlap, it is possible to perform control to allocate the number of downlink control channel candidates to each of the control resource sets such that the number of downlink control channel candidates does not exceed the given value per combination of the control resource sets. Although the number of downlink control channel candidates (the number of times of blind decoding) to be monitored in the given time unit fluctuates, it is possible to perform control such that the number of downlink control channel candidates does not exceed the given value configured in advance.

<First Aspect>

The first aspect is a UE that includes: a reception section that receives a downlink control channel transmitted by each of a plurality of control resource sets; and a control section that controls monitoring of downlink control channel candidates, and the UE configures the number of downlink control channel candidates in a given time unit to a combination of control resource sets, and controls allocation of the number of downlink control channel candidates to each of the control resource sets assuming that the configured number of downlink control channel candidates does not exceed terminal capability.

Furthermore, the first aspect is a base station that includes: a reception section that receives terminal capability of the number of downlink control channel candidates from a user terminal; and a control section that controls a configuration of a control resource set to the user terminal, and the base station configures the number of downlink control channel candidates in a given time unit to a combination of control resource sets, and controls allocation of the number of downlink control channel candidates to each of the control resource sets such that the number of downlink control channel candidates does not exceed terminal capability per combination of the control resource sets.

For example, a case will be assumed where a plurality of control resource sets of different monitoring periodicities are configured to a UE. Although a maximum value of the number of downlink control channel candidates (the number of times of blind decoding) to be monitored in the given time unit is configured to a combination of control resource sets including individual control resource sets, each maximum value is controlled as a numerical value that does not exceed a maximum value (referred to as UE capability below) of the number of downlink control channel candidates (the number of times of blind decoding (BD)) that the UE can monitor in a given time unit. That is, this is an example where a configuration that exceeds UE capability is not permitted even in a case of a maximum value of any combination of control resource sets.

FIG. 3A illustrates three control resource sets (CORESETs #1 to #3) of different monitoring periodicities. The monitoring periodicity of a first control resource set (CORESET #1) is configured to 2 slots (or 2 symbols), and "M" is configured as a setting value and a maximum value of the number of downlink control channel candidates (the number of times of blind decoding). The number of downlink control channel candidates of the first control resource set (CORESET #1) is configured to the identical value "M" on any monitoring occasion (a slot or a symbol).

The monitoring periodicity of a second control resource set (CORESET #2) is configured to 3 slots (or 3 symbols), and "N" is configured as a setting value and a maximum value of the number of downlink control channel candidates (the number of times of blind decoding). The number of downlink control channel candidates of the second control resource set (CORESET #2) is configured to "N" on any monitoring occasion.

The monitoring periodicity of a third control resource set (CORESET #3) is configured to 12 slots (or 12 symbols), and "K" is configured as a setting value and a maximum value of the number of downlink control channel candidates (the number of times of blind decoding). The number of downlink control channel candidates of the third control resource set (CORESET #3) is configured to "K" on any monitoring occasion.

Although a total value (M+N+K) of the numbers of downlink control channel candidates (the number of times of blind decoding) in the given time unit (e.g., the slot or the symbol) in which monitoring occasions of the three control resource sets (CORESETs #1 to #3) overlap maximizes, the total value does not exceed UE capability (=M+N+K). This example assumes that the UE capability is the same as or more than (M+N+K).

FIG. 3B illustrates configuration patterns of the maximum values and setting values of the numbers of downlink control channel candidates assuming a case where the three control resource sets (CORESETs #1 to #3) are configured to the UE. As illustrated in FIG. 3B, the maximum value of the number of downlink control channel candidates (the number of times of blind decoding) to be monitored in the given time unit is configured to a combination of control resource sets including the individual control resource sets (CORESETs #1 to #3), and, furthermore, the setting value allocated such that the number of downlink control channel candidates does not exceed the maximum value is configured to each control resource set per combination of the control resource sets.

In an example illustrated in FIG. 3A, monitoring occasions of the first, second and third control resource sets (CORESETs #1 to #3) overlap in a head slot S1 and a 13th slot S13 from the head. On the monitoring occasion for monitoring the three control resource sets (CORESETs #1 to #3) in the given time unit, the number of downlink control channel candidates (the number of times of blind decoding) in the UE is the maximum value (M+N+K). This example assumes that UE capability is the same or more than (M+N+K), and therefore all maximum values configured to the combinations of the control resource sets are configured not to exceed the UE capability as illustrated in FIG. 3B.

Furthermore, a slot S14 in which there is only the first control resource set (CORESET #1) is limited to the maximum value (=M) of the number of downlink control channel candidates (the number of times of blind decoding) configured to the first control resource set (CORESET #1). Furthermore, a slot S19 in which the first and second control resource sets (CORESETs #1 and #2) overlap is limited to the total value (M+N) of the setting value (=M) of the number of downlink control channel candidates (the number of times of blind decoding) configured to the first control resource set (CORESET #1), and the setting value (=N) of the number of downlink control channel candidates (the number of times of blind decoding) configured to the second control resource set (CORESET #2).

The base station assumes that the three control resource sets (CORESETs #1 to #3) illustrated in FIGS. 3A and 3B are configured to the UE. The base station can configure the three control resource sets (CORESETs #1 to #3) to the UE by a UE-specific higher layer signaling. The configuration of the control resource sets (CORESETs #1 to #3) can include the monitoring periodicities, and the setting values and the maximum values of the numbers of downlink control channel candidates (the number of times of blind decoding).

The base station requests UE capability (or specified capability) related to the number of downlink control channel candidates (the number of times of blind decoding) to the UE. The base station configures the maximum value that does not exceed the UE capability reported from the UE, to the combination of the control resource sets including the individual control resource sets (CORESETs #1 to #3), and allocates the setting value to each control resource set such that the setting value does not exceed the maximum value.

It can be said that the base station configures the maximum values and the setting values of the numbers of downlink control channel candidates (the numbers of times of blind decoding) to the control resource sets (CORESETs #1 to #3) to realize allocation (blind decoding split) of the number of downlink control channel candidates between the control resource sets. Thus, the base station performs control such that the maximum value of the number of downlink control channel candidates (the number of times of blind decoding) does not exceed the UE capability in any combination of a plurality of control resource sets.

The UE assumes that the three control resource sets (CORESETs #1 to #3) illustrated in FIGS. 3A and 3B are configured. The UE configures the three control resource sets (CORESETs #1 to #3) by a UE-specific higher layer signaling. The configuration of the control resource sets (CORESETs #1 to #3) includes the monitoring periodicities, and the setting values and the maximum values of the numbers of downlink control channel candidates (the number of times of blind decoding).

The UE specifies a monitoring occasion based on the monitoring periodicity per control resource set (CORESETs #1 to #3), and controls the number of times of blind decoding such that the number of times of blind decoding does not exceed the maximum value configured per combination of the control resource sets. Even when, for example, the monitoring occasions of all control resource sets (CORESETs #1 to #3) overlap in the same given time unit (e.g., slot), the total value of the numbers of times of blind decoding does not exceed the UE capability in the UE. Consequently, it is possible to prevent an operation failure caused when blind decoding that exceeds the UE capability occurs.

Thus, according to the first aspect, the maximum value and the setting value of the number of downlink control channel candidates (the number of times of blind decoding) that does not exceed UE capability are configured to all combinations of the control resource sets, so that the number of downlink control channel candidates (the number of times of blind decoding) is allocated to a plurality of control resource sets such that the number of downlink control channel candidates does not exceed the UE capability. When the number of times of blind decoding that exceeds the UE capability actually occurs, there is a problem that a UE operation becomes unstable. However, according to the first aspect, it is possible to prevent a failure that the number of downlink control channel candidates (the number of times of blind decoding) that exceeds the UE capability is allocated, and prevents the UE operation from becoming unstable.

<Second Aspect>

According to the second aspect, when the number of downlink control channel candidates that needs to be monitored in the given time unit (e.g., slot), control is performed so as not to monitor part or all of downlink control channel candidates.

Furthermore, according to the second aspect, when the number of downlink control channel candidates that needs to be monitored in the given time unit (e.g., slot) exceeds the given value, part of downlink control channel candidates are monitored, and an uplink signal is transmitted based on the detected downlink control channels.

Similar to the first aspect, the maximum value of the number of downlink control channel candidates (the number of times of blind decoding) to be monitored in the given time unit is configured to a combination of control resource sets including the individual resource sets (CORESETs #1 to #3), and, furthermore, the setting value allocated such that the number of downlink control channel candidates does not exceed the maximum value is configured to each control resource set per combination of the control resource sets. However, the second aspect permits a configuration where the maximum value of the number of downlink control channel candidates exceeds a given value (e.g., UE capability) in part of combinations of control resource sets.

In a case of a configuration where the number of downlink control channel candidates to be monitored in the given time unit (e.g., slot) exceeds UE capability, the UE may not monitor the downlink control channel candidates of all target control resource sets. Alternatively, the UE may monitor the downlink control channel candidates of only optional control resource sets.

One example will be described where, similar to the first aspect, the three control resource sets (CORESETs #1 to #3) are configured to the UE, and the monitoring periodicity and the numbers of downlink control channel candidates (M, N or K) illustrated in FIG. 3A are configured to each control resource set (CORESETs #1 to #3).

FIG. 4 illustrates a state where the maximum value of the number of downlink control channel candidates (the number of times of blind decoding) to be monitored in the given time unit is configured to the combination of the control resource sets including the individual control resource sets (CORESETs #1 to #3), and, furthermore, the setting value allocated such that the number of downlink control channel candidates does not exceed the maximum value is configured to each control resource set per combination of the control resource sets.

"M" is configured as the setting value and the maximum value of the number of downlink control channel candidates (the number of times of blind decoding) to the first control resource set (CORESET #1). The setting value and the maximum value="M" are configured not to exceed UE capability. Similarly, "N" is configured as the setting value (=maximum value) of the number of downlink control channel candidates (the number of times of blind decoding) to the second control resource set (CORESET #2), and K is configured as the setting value (=maximum value) of the number of downlink control channel candidates to the third control resource set (CORESET #3). The setting values of the numbers of downlink control channel candidates=N and K are configured not to exceed the UE capability. Furthermore, the setting values and the maximum values (=M+N, M+K and N+K) of the number of downlink control channel candidates for a combination of two control resource sets are configured not to exceed the UE capability.

According to the second aspect, as illustrated in FIG. 4, the setting value and the maximum values (=M+N+K) of the numbers of downlink control channel candidates (the number of times of blind decoding) for a combination of the three control resource sets (CORESETs #1 to #3) are configured to exceed the UE capability.

Although the base station controls the setting value and the maximum value of the combination of one or two control resource sets such that the setting value and the maximum value do not exceed the UE capability, the setting value and the maximum value (=M+N+K) of the number of downlink control channel candidates (the number of times of blind decoding) of the combination of the three control resource sets (CORESETs #1 to #3) that maximizes the number of times of blind decoding are configured to exceed the UE capability.

The UE is configured such that the UE may not monitor downlink control channel candidates of the control resource set to which the number of downlink control channel candidates (the number of times of blind decoding) exceeding the UE capability has been configured (relaxing of monitoring). When, for example, the number of downlink control channel candidates on a certain monitoring occasion is configured to exceed the UE capability, control may be performed so as not to monitor these downlink control channel candidates.

In the example illustrated in FIG. 4, since the setting value (=M+N+K) of the number of downlink control channel candidates exceeds the UE capability on a monitoring occasion in which the three control resource sets (CORESETs #1 to #3) overlap, the UE may not monitor these downlink control channel candidates. When, for example, the setting value (=M+N+K) of the number of downlink control channel candidates that exceeds the UE capability is configured, the UE does not monitor the downlink control channel candidates of one of the control resource set CORESETs #1, #2 and #3.

Alternatively, although the UE is configured such that the UE may not monitor the downlink control channel candidates on an optional monitoring occasion that exceeds a given value (e.g., UE capability), if the UE performs monitoring, the UE may execute a specified operation.

For example, a case will be assumed where the UE blind-decodes an optional control resource set on a monitoring occasion having the configuration that exceeds the UE capability, and detects DCI for scheduling a PDSCH or a PUSCH. In this case, the UE transmits HARQ-ACK for the PDSCH scheduled by the DCI, or transmits the PUSCH scheduled by the DCI. That is, although monitoring on the monitoring occasion to which the number of downlink control channel candidates (=M+N+K) exceeding the UE capability is configured is optional, and therefore monitoring is relaxed for the UE, if the UE performs monitoring and detects the DCI, the UE executes the specified operation (HARQ-ACK transmission or PUSCH transmission).

Alternatively, even if the UE performs monitoring on the monitoring occasion having the configuration that exceeds the UE capability, the UE may not execute the specified operation.

For example, a case will be assumed where the UE performs blind decoding on a monitoring occasion having the configuration that exceeds the UE capability, and detects DCI for scheduling a PDSCH or a PUSCH. In this case, the UE does not transmit HARQ-ACK for the PDSCH scheduled by the DCI and does not transmit the PUSCH scheduled by the DCI. That is, even if the UE performs monitoring on a monitoring occasion to which the number of downlink control channel candidates (=M+N+K) exceeding the UE capability is configured, and detects DCI, the UE does not execute the specified operation (HARQ-ACK transmission or PUSCH transmission).

<Third Aspect>

According to the third aspect, when the number of downlink control channel candidates that needs to be monitored in the given time unit (e.g., slot) exceeds the given value, part of downlink control channel candidates to be monitored are selected based on given conditions.

For example, similar to the first and second aspects, according to the third aspect, the maximum value of the number of downlink control channel candidates (the number of times of blind decoding) to be monitored in the given time unit is configured to a combination of control resource sets including individual control resource sets (CORESETs #1 to #3), and, furthermore, the setting value allocated such that the number of downlink control channel candidates does not exceed the maximum value is configured to each control resource set per combination of the control resource sets. According to the third aspect, when the maximum value of the number of downlink control channel candidates is configured to exceed the given value (e.g., UE capability), the UE selects a control resource set based on a given rule, and monitors downlink control channel candidates of a selected control resource set.

FIG. 5 illustrates a state where the maximum value of the number of downlink control channel candidates (the number of times of blind decoding) to be monitored in the given time unit is configured to a combination of control resource sets including the individual control resource sets (CORESETs #1 to #3), and, furthermore, the setting value allocated such that the number of downlink control channel candidates does not exceed the maximum value is configured to each control resource set per combination of the control resource sets.

"M" is configured as the setting value and the maximum value of the number of downlink control channel candidates in the given time unit to the first control resource set (CORESET #1), and the setting value (maximum value) ="M" is configured not to exceed UE capability. Similarly, "N" is configured as the setting value and the maximum value of the number of downlink control channel candidates to the second control resource set (CORESET #2), and "K" is configured as the setting value and the maximum value of the number of downlink control channel candidates to the third control resource (CORESET #3). The setting values of the numbers of downlink control channel candidates in the given time unit (e.g., slot)=N and K are configured not to exceed the UE capability. Furthermore, the setting values (=M+N, M+K and N+K) of the numbers of downlink control channel candidates for the combination of the two control resource sets are configured not to exceed UE capability.

According to the third aspect, as illustrated in FIG. 5, the setting value (=M+N+K) of the number of downlink control channel candidates for the combination of the three control resource sets (CORESETs #1 to #3) is configured to exceed UE capability. That is, the configuration of the number of downlink control channel candidates in the given time unit permits part of the configuration that exceeds the UE capability.

According to the third aspect, when the number of downlink control channel candidates exceeding UE capability is configured, downlink control channel candidates of the control resource set selected based on the given rule are monitored. That is, a specific control resource set is selected (or dropped) based on the given rule, and is controlled to the number of downlink control channel candidates equal to or less than the UE capability. The rule for determining the control resource set can be defined by standards, and can be fixedly applied. Alternatively, it is also possible to notify the UE of the rule by a higher layer signaling.

A rule for determining a control resource set will be specifically described.

(First Rule)

A control resource set whose downlink control channel candidates need to be monitored may be controlled so as to be selected based on an index of the control resource set. The UE can select the control resource set of a smaller index from, for example, a plurality of control resource sets.

On, for example, a monitoring occasion in which three control resource sets (CORESETs #1 to #3) overlap (see the slots S1 and S13 in FIG. 3), the number of downlink control channel candidates (=M+N+K) exceeds the UE capability, and therefore control is performed to drop the first control resource set CORESET #1 having the smallest index so as not to monitor the first control resource set CORESET #1 (see FIG. 5). Alternatively, on the monitoring occasion (see the slots S1 and S13 in FIG. 3) in which the three control resource sets (CORESETs #1 to #3) overlap, the number of downlink control channel candidates (=M+N+K) exceeds the UE capability, and therefore the first control resource set CORESET #1 having the smallest index is selected. Control is performed so as not to monitor the downlink control channel candidates of the second and third control resource sets CORESETs #2 and #3 that have not been selected, and the number of times of blind decoding decreases by the number of downlink control channel candidates (N+K). Selection may be performed by using not only the smallest index but also an index determined according to the given rule.

(Second Rule)

A control resource set whose downlink control channel candidates need to be monitored may be controlled so as to be selected based on an aggregation level of the downlink control channel candidates (search space). A UE can be configured to select the control resource set to which a higher aggregation level is configured from a plurality of control resource sets. Furthermore, the UE can be configured to select in order a control resource to which a higher aggregation level is configured without exceeding the UE capability.

It is assumed regarding the three control resource sets CORESETs #1 to #3 illustrated in FIG. 5 that the highest aggregation level is applied to the CORESET #1, and the second highest aggregation level is applied to the CORESET #2. In this case, the UE preferentially selects the CORESET #1. Furthermore, as long as the CORESETs #1 and #2 do not exceed the UE capability, the CORESETs #1 and #2 are selected.

Alternatively, the UE can be configured to select a control resource set to which a lower aggregation level is configured from a plurality of control resource sets. Furthermore, the UE can be configured to select in order the control resource set to which a lower aggregation level is configured without exceeding the UE capability.

(Third Rule)

A control resource set whose downlink control channel candidates need to be monitored may be controlled such that a UE-common control resource is selected first. Next, it may be performed to select a UE-specific control resource set. Furthermore, the above first or second rule may be combined to select a control resource set whose downlink control channel candidates need to be monitored.

When the UE selects a control resource set that needs to be monitored and detects DCI based on the above first, second or third rule or a combination of these rules on a monitoring occasion having the configuration that exceeds the UE capability, the UE executes a specified operation. For example, a case will be assumed where blind decoding is performed on a monitoring occasion of the selected control resource set and DCI for scheduling a PDSCH or a PUSCH is detected. In this case, the UE transmits HARQ-ACK for the PDSCH scheduled by the DCI, or transmits the PUSCH scheduled by the DCI.

Consequently, as long as the number of downlink control channel candidates does not exceed the UE capability, the base station can easily schedule a control channel per control resource set by fixing the number of downlink control channel candidates per control resource set.

Second Embodiment

According to the second embodiment, when a plurality of control resource sets are configured to a UE, a setting value of the number of downlink control channel candidates for each control resource set is controlled based on the number of control resource sets, search spaces or aggregation levels in a given time unit (e.g., slot).

<First Aspect>

According to the first aspect, the number of downlink control channel candidates to be monitored in each control resource set is changed according to the number of control resource sets configured in the given time unit (e.g., slot).

The setting value of the number of downlink control channel candidates for each control resource set is controlled such that, irrespectively of, for example, the number of control resource sets (or search spaces or aggregation levels) in the given time unit, the number of downlink control channel candidates (the number of times of blind decoding) is fixed.

Figures 6A, 6B:
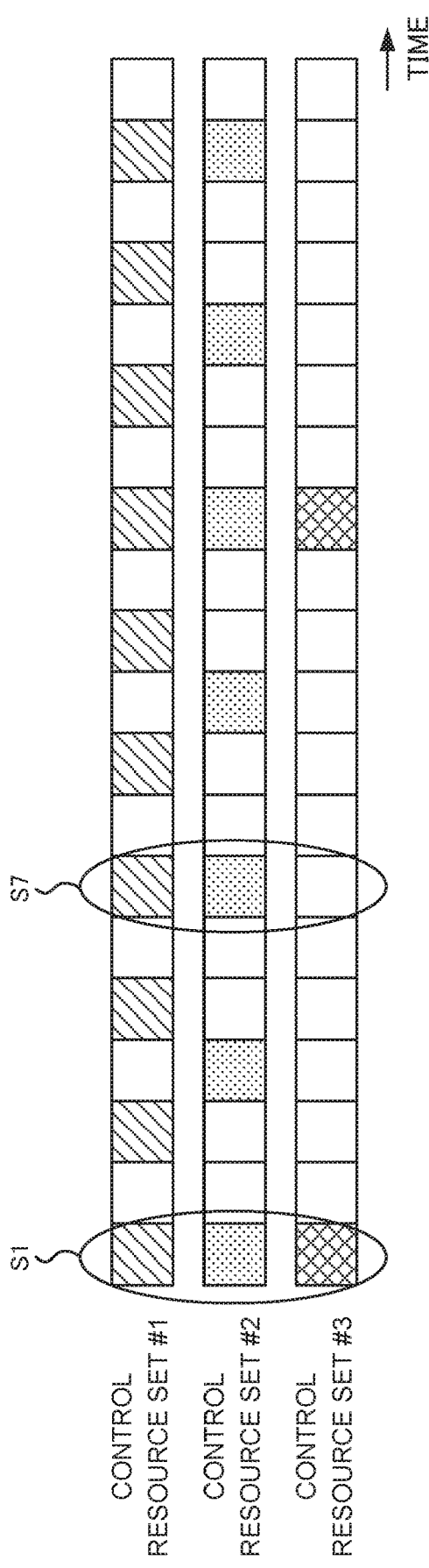
FIG. 6A is a diagram illustrating three control resource sets of different monitoring periodicities.
FIG. 6B is a diagram illustrating configuration patterns of the numbers of downlink control channel candidates according to a second embodiment (first aspect).

FIG. 6A illustrates three control resource sets (CORESETs #1 to #3) of different monitoring periodicities. For example, monitoring occasions of three control resource sets (CORESETs #1 to #3) overlap in a slot S1. Furthermore, monitoring occasions of the first and second control resource sets (CORESETs #2 and #3) overlap in a slot S7.

FIG. 6B illustrates a setting value and a maximum value of the number of downlink control channel candidates (the number of times of blind decoding) for all combinations of the three control resource sets (CORESETs #1 to #3). The maximum value of the number of downlink control channel candidates (the number of times of blind decoding) is configured as the same number (M+N+K) to each combination of the three control resource sets (CORESETs #1 to #3). The same number (M+N+K) as the maximum value is configured to the setting value of the number of downlink control channel candidates (the number of times of blind decoding) for a single control resource set (CORESETs #1 to #3).

On the other hand, in a case of a combination of the first control resource set (CORESET #1) and the second control resource set (CORESET #2), a setting value (M+X) is configured to the first control resource set (CORESET #1), and a setting value (N+K−X) is configured to the second control resource set (CORESET #2) such that the total value of the number of downlink control channel candidates is the maximum value (M+N+K).

Similarly, in a case of a combination of the first control resource set (CORESET #1) and the third control resource set (CORESET #3), a setting value (M+Y) is configured to the first control resource set (CORESET #1), and a setting value (K+N−Y) is configured to the third control resource set (CORESET #3).

Furthermore, in a case of the combination of the second control resource set (CORESET #2) and the third control resource set (CORESET #3), the setting value (N+Z) is configured to the second control resource set (CORESET #2), and the setting value (K+M−Z) is configured to the third control resource set (CORESET #3).

In a case of a combination of the first, second and third control resource sets (CORESETs #1 to #3), the setting value (M) is configured to the first control resource set (CORESET #1), the setting value (N) is configured to the second control resource set (CORESET #2), and the setting value (K) is configured to the third control resource set (CORESET #3).

Consequently, by blind-decoding a fixed number of control channel candidates irrespectively of the configuration of the control resource set, it is possible to use a sufficient number of candidates even when the number of control resource sets is small, lower a probability of a situation (PDCCH blocking) that control channels for other terminals are allocated, and control channels for the other terminals are not allocated.

<Second Aspect>

According to the second aspect, a setting value of the number of downlink control channel candidates (the number of times of blind decoding) configured per control resource set is basically maintained irrespectively of the number of control resource sets (or search spaces or aggregation levels) on a monitoring occasion, a setting value and a maximum value of the number of downlink control channel candidates (the number of times of blind decoding) are configured to become small for a combination of control resource sets that exceeds UE capability.

FIG. 7 illustrates the setting value and the maximum value of the number of downlink control channel candidates (the number of times of blind decoding) for all combinations of three control resource sets (CORESETs #1 to #3). The same setting value (M+X) is configured to the first control resource set (CORESET #1) even in a case of any combination except combinations that exceed the UE capability. M+X is configured to the maximum value of the number of downlink control channel candidates (the number of times of blind decoding) of the first control resource set (CORESET #1).

The same setting value (N+Y) is configured to the second control resource set (CORESET #2) even in a case of any combination except combinations that exceed the UE capability, and N+Y is configured to the maximum value of the number of downlink control channel candidates (the number of times of blind decoding) of the second control resource set (CORESET #2). The same setting value (K+Z) is configured to the third control resource set (CORESET #3) even in a case of any combination except combinations that exceed the UE capability, and K+Z is configured to the maximum value of the number of downlink control channel candidates (the number of times of blind decoding) of the third control resource set (CORESET #3).

Furthermore, M+N+X+Y is configured to the maximum value of the number of downlink control channel candidates (the number of times of blind decoding) for a combination of the first and second control resource sets (CORESETs #1 and #2), and M+K+X+Z is configured to the maximum value of the number of downlink control channel candidates for a combination of the first and third control resource sets (CORESETs #1 and #3). The maximum value is configured to the second and third control resource sets (CORESETs #2 and #3), too, similar to the above as illustrated in FIG. 7.

By the way, by simply adding the setting values (M+X, N+Y and K+X) configured to the first, second and third control resource sets (CORESETs #1, #2 and #3), the number of downlink control channel candidates (the number of times of blind decoding) that exceeds the UE capability is obtained.

Hence, as illustrated in FIG. 7, a numerical value (M+N+K) from which X, Y and Z are subtracted is configured as the maximum value to the combination of the first, second and third control resource sets (CORESETs #1, #2 and #3). Furthermore, the setting value of the number of downlink control channel candidates (the number of times of blind decoding) for the first control resource set (CORESET #1) is configured to M, and the setting values of the numbers of downlink control channel candidates for the second and third control resource sets (CORESETs #2 and #3) are respectively configured to N and K.

In addition, when a plurality of control resource sets are configured to the UE, the AL and the numbers of blind decoding candidates to be monitored in the control resource set may differ depending on a size of the control resource set. The control resource set size may be expressed by the number of resource units included in the control resource unit (the number of resource units in the control resource set).

(Radio Communication System)

The configuration of the radio communication system according to one embodiment of the present invention will be described below. This radio communication system uses one or a combination of the radio communication method according to each of the above embodiments of the present invention to perform communication.

Figure 8:
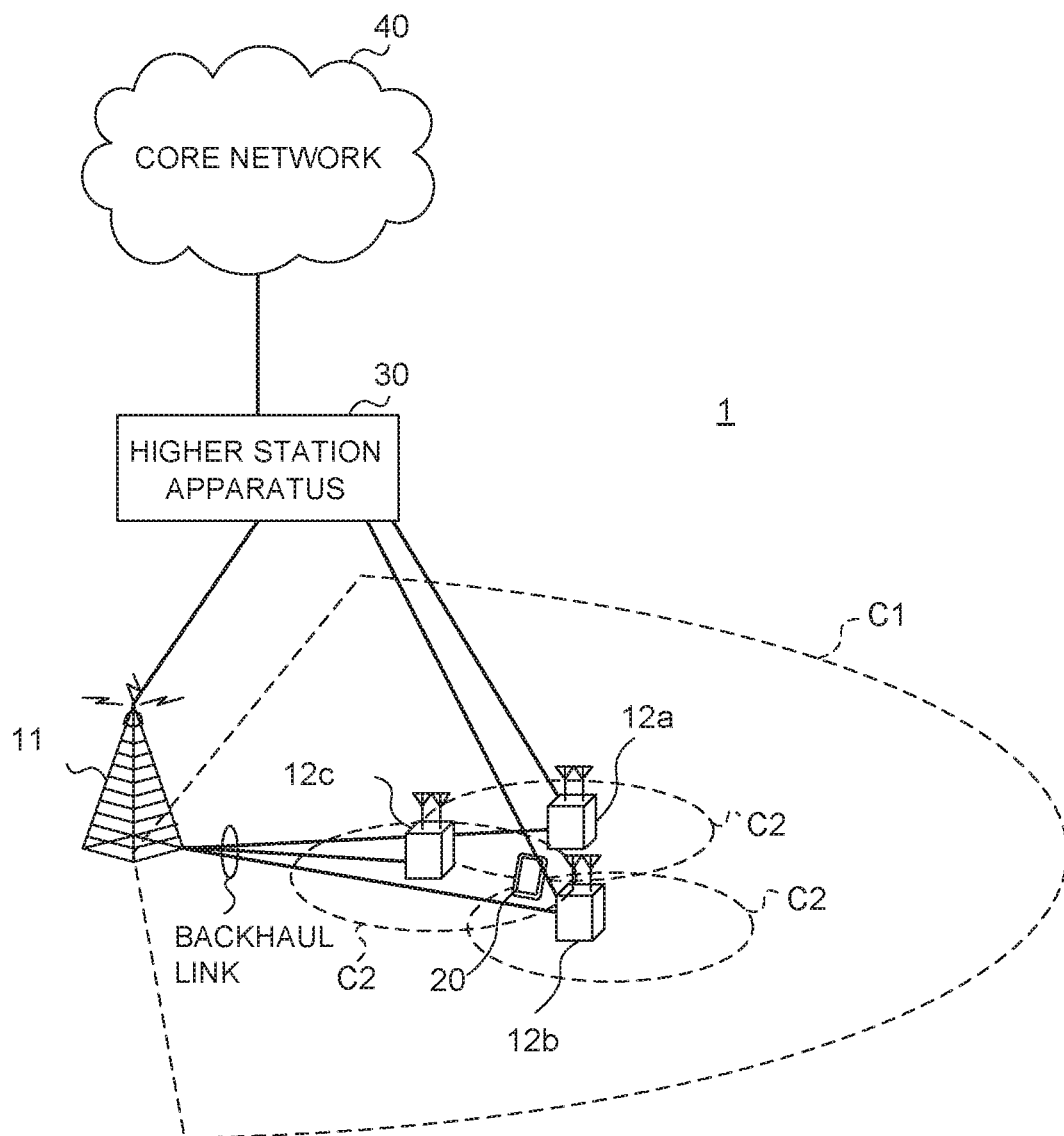
FIG. 8 is a diagram illustrating one example of a schematic configuration of a radio communication system according to one embodiment of the present invention.

FIG. 8 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and user terminals 20 are not limited to those illustrated in FIG. 8.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 may apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The radio base station 11 and each radio base station 12 (or the two radio base stations 12) may be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink, and applies Single Carrier Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

(Radio Base Station)

Figure 9:
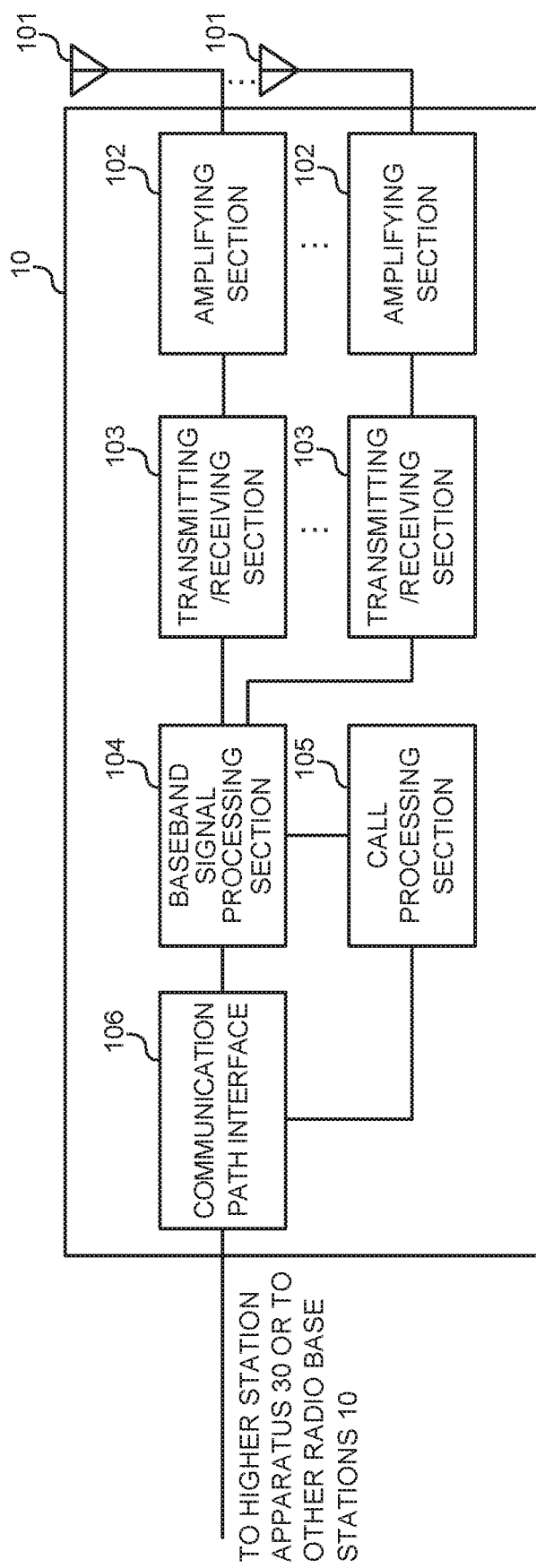
FIG. 9 is a diagram illustrating one example of an overall configuration of a radio base station according to the one embodiment of the present invention.

FIG. 9 is a diagram illustrating one example of an overall configuration of the radio base station according to the one embodiment of the present invention. The radio base station 10 includes pluralities of transmission/reception antennas 101, amplifying sections 102 and transmitting/receiving sections 103, a baseband signal processing section 104, a call processing section 105 and a communication path interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency band, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present invention. In this regard, the transmitting/receiving sections 103 may be composed as an integrated transmission/reception section or may be composed of transmission sections and reception sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the communication path interface 106. The call processing section 105 performs call processing (such as configuration and release) of a communication channel, state management of the radio base station 10, and radio resource management.

The communication path interface 106 transmits and receives signals to and from the higher station apparatus 30 via a given interface. Furthermore, the communication path interface 106 may transmit and receive (backhaul signaling) signals to and from the another radio base station 10 via an inter-base station interface (e.g., optical fibers compliant with the Common Public Radio Interface (CPRI) or the X2 interface).

Each transmitting/receiving section 103 transmits a DL signal (e.g., downlink control information including a UL transmission instruction (e.g., a UL grant) and/or an HARQ-ACK transmission instruction, or downlink data). Each transmitting/receiving section 103 receives a UL channel that is scheduled (or allocated) a first duration after receiving a DL signal, and given information (e.g., a PHR and/or CSI) transmitted on the UL channel.

Each transmitting/receiving section 103 may receive as UE capability information at least one of pieces of information related to a processing time (N1) of HARQ-ACK for DL data (PDSCH), a UL data processing time (N2), a PH processing time (N3) and a CSI processing time (N4).

Figure 10:
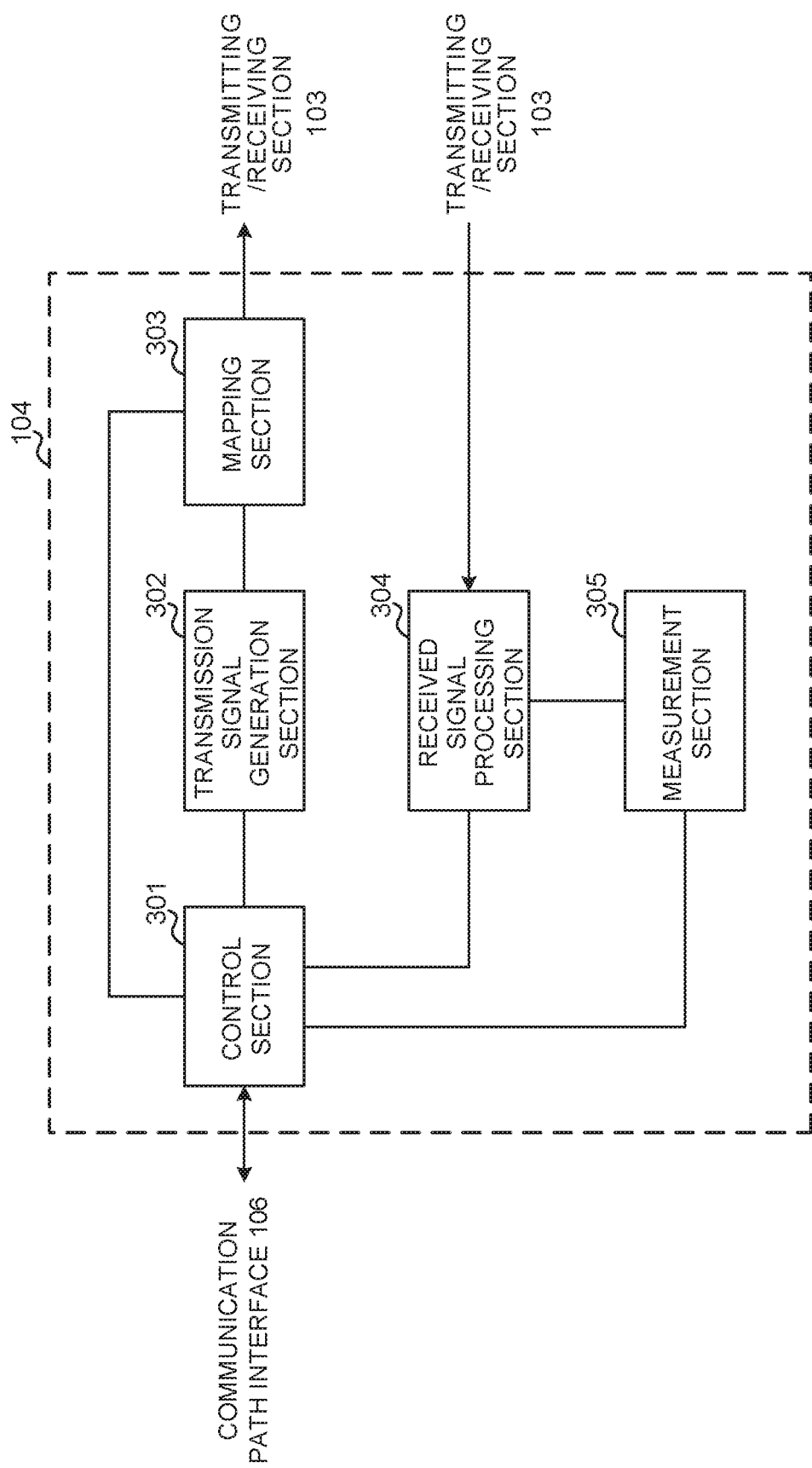
FIG. 10 is a diagram illustrating one example of a function configuration of the radio base station according to the one embodiment of the present invention.

FIG. 10 is a diagram illustrating one example of a function configuration of the radio base station according to the one embodiment of the present invention. In addition, this example mainly illustrates function blocks of characteristic portions according to the present embodiment, and may assume that the radio base station 10 includes other function blocks, too, that are necessary for radio communication.

The baseband signal processing section 104 includes at least a control section (scheduler) 301, a transmission signal generation section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generation section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal that is transmitted on the PUCCH and/or the PUSCH and is, for example, transmission acknowledgement information), a random access preamble (e.g., a signal transmitted on the PRACH) and an uplink reference signal.

The control section 301 controls UL data and/or HARQ-ACK transmission timings based on information notified from the UE (e.g., at least one of the pieces of information related to the processing time (N1) of HARQ-ACK for DL data (PDSCH), the UL data processing time (N2), the PH processing time (N3) and the CSI processing time (N4)).

Furthermore, the control section 301 can configure to the UE a control resource set by a UE-specific higher layer signaling. The configuration of the control resource set can include a monitoring periodicity, and a setting value and a maximum value of the number of downlink control channel candidates (the number of times of blind decoding) (see FIGS. 3B, 4, 5, 6B and 7).

The control section 301 requests UE capability (or specified capability) related to the number of downlink control channel candidates (the number of times of blind decoding) to the UE, configures a maximum value that does not exceed the UE capability reported from the UE, to a combination of control resource sets, and allocates a setting value to each control resource set such that the setting value does not exceed the maximum value (FIG. 3B). Thus, the control section 301 performs control such that the maximum value of the number of downlink control channel candidates (the number of times of blind decoding) does not exceed the UE capability in each combination of a plurality of control resource sets. Particularly, the control section 301 guarantees that the number of downlink control channel candidates (the number of times of blind decoding) does not exceed the UE capability in a case of the first embodiment (first aspect).

The transmission signal generation section 302 generates a downlink signal (such as a downlink control signal, a downlink data signal or a downlink reference signal) based on an instruction from the control section 301, and outputs the downlink signal to the mapping section 303. The transmission signal generation section 302 can be composed of a signal generator, a signal generating circuit or a signal generating apparatus described based on the common knowledge in the technical field according to the present invention.

The transmission signal generation section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generation section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generation section 302, on a given radio resource based on the instruction from the control section 301, and outputs the downlink signal to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 11:
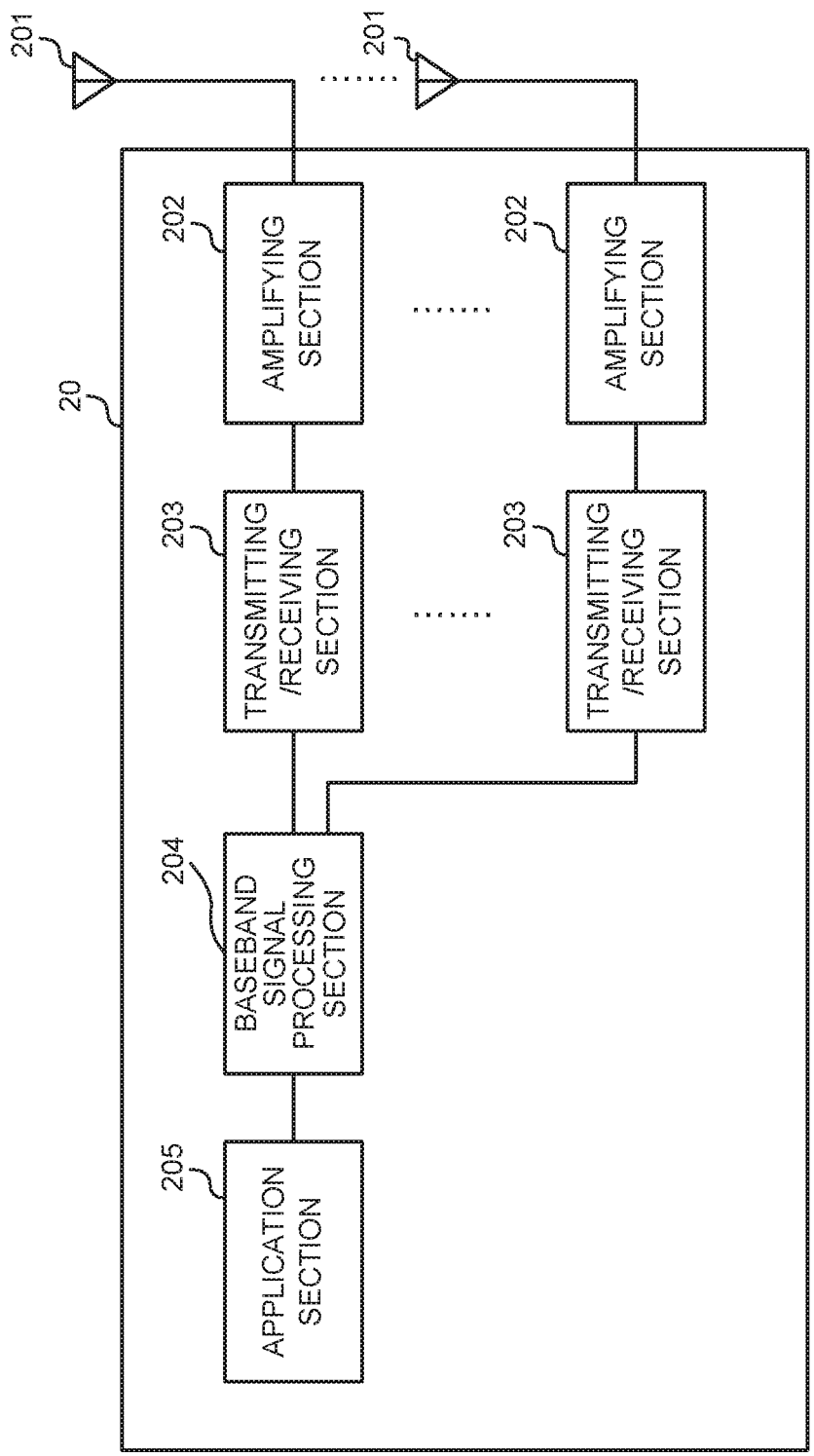
FIG. 11 is a diagram illustrating one example of an overall configuration of a user terminal according to the one embodiment of the present invention.

FIG. 11 is a diagram illustrating one example of an overall configuration of the user terminal according to the one embodiment of the present invention. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present invention. In this regard, the transmitting/receiving sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmitting/receiving section 203. Each transmitting/receiving section 203 converts the baseband signal output from the baseband signal processing section 204 into a radio frequency band, and transmits a radio frequency signal. The radio frequency signal subjected to the frequency conversion by each transmitting/receiving section 203 is amplified by each amplifying section 202, and is transmitted from each transmission/reception antenna 201.

Each transmitting/receiving section 203 receives a DL signal (e.g., downlink control information including a UL transmission instruction (e.g., UL grant) and/or an HARQ-ACK transmission instruction, and downlink data). Each transmitting/receiving section 203 transmits a UL channel that is scheduled (or allocated) the first duration after receiving the DL signal, and given information (e.g., a PHR and/or CSI) by using the UL channel.

Each transmitting/receiving section 203 may transmit as UE capability information at least one of pieces of information related to the processing time (N1) of HAQR-ACK for DL data (PDSCH), the UL data processing time (N2), the PH processing time (N3) and the CSI processing time (N4).

Figure 12:
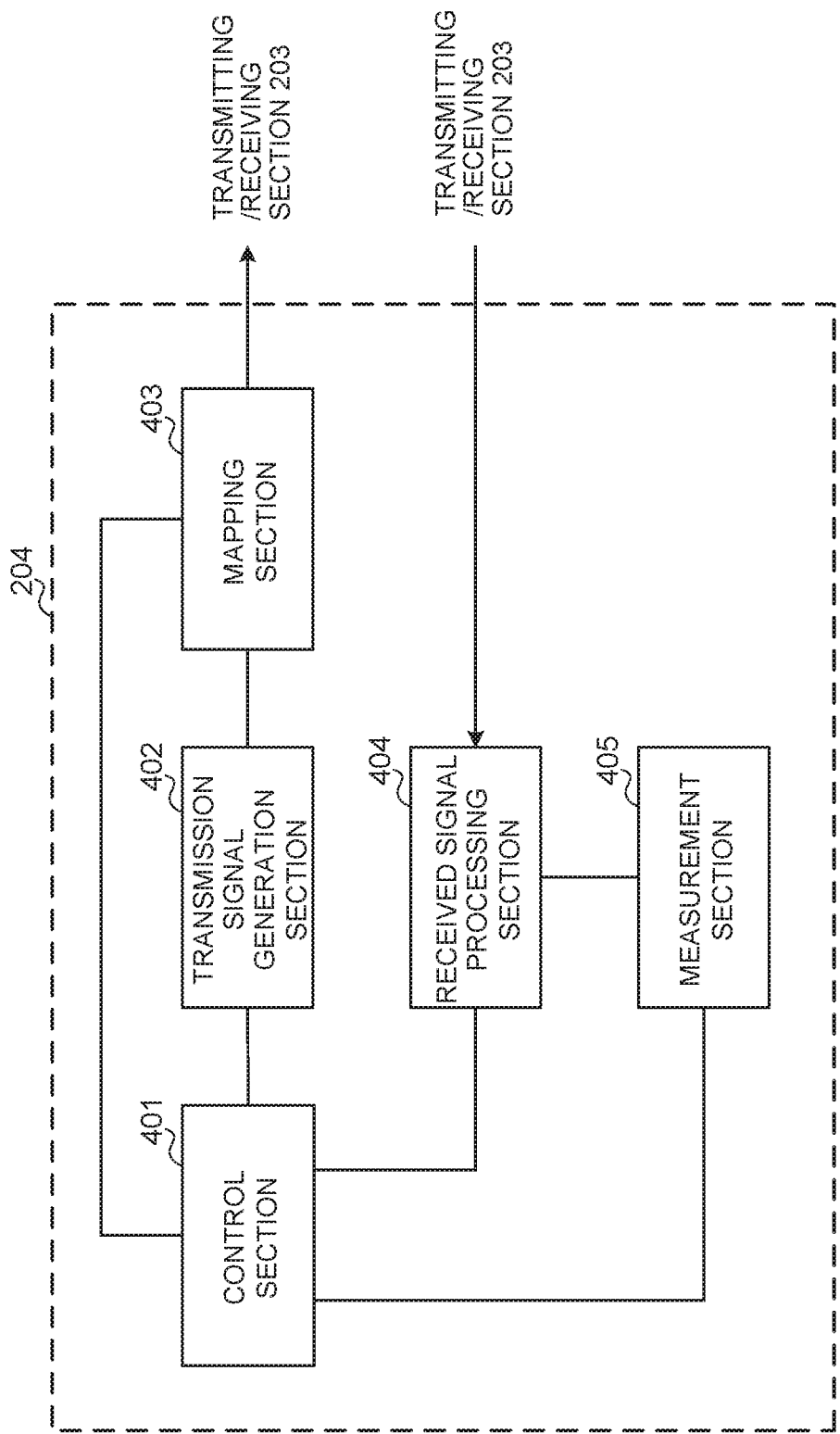
FIG. 12 is a diagram illustrating one example of a function configuration of the user terminal according to the one embodiment of the present invention.

FIG. 12 is a diagram illustrating one example of a function configuration of the user terminal according to the one embodiment of the present invention. In addition, this example mainly illustrates function blocks of characteristic portions according to the present embodiment, and may assume that the user terminal 20 includes other function blocks, too, that are necessary for radio communication.

The baseband signal processing section 204 of the user terminal 20 includes at least a control section 401, a transmission signal generation section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generation section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 can control a configuration of a control resource set by a UE-specific higher layer signaling. For example, the control section 401 controls the configuration of the control resource set to which the maximum value and the setting value illustrated in FIG. 3B, 4, 5, 6B or 7 have been configured.

The control section 401 specifies a monitoring occasion based on a monitoring periodicity per control resource set (CORESETs #1 to #3), and controls the number of times of blind decoding such that the number of times of blind decoding does not exceed the maximum value configured per combination of the control resource set (first embodiment).

Furthermore, the control section 401 performs control so as not to monitor part or all of downlink control channel candidates when the number of downlink control channel candidates that needs to be monitored in a given time unit (e.g., slot) exceeds the given value (the second aspect of the first embodiment).

Furthermore, the control section 401 can select part of downlink control channel candidates to be monitored based on the given conditions when the number of downlink control channel candidates that needs to be monitored in the given time unit (e.g., slot) exceeds the given value (the third aspect of the first embodiment).

Furthermore, the control section 401 changes the number of downlink control channel candidates to be monitored in each control resource set according to the number of control resource sets configured in the given time unit (e.g., slot) (the first aspect of the second embodiment).

Furthermore, the control section 401 performs control to make the setting value and the maximum value of the number of downlink control channel candidates (the number of times of blind decoding) smaller for the combination of the control resource sets that exceeds UE capability (the second aspect of the second embodiment).

The transmission signal generation section 402 generates an uplink signal (such as an uplink control signal, an uplink data signal or an uplink reference signal) based on an instruction from the control section 401, and outputs the uplink signal to the mapping section 403. The transmission signal generation section 402 can be composed of a signal generator, a signal generating circuit or a signal generating apparatus described based on the common knowledge in the technical field according to the present invention.

The transmission signal generation section 402 generates an uplink control signal related to transmission acknowledgement information and Channel State Information (CSI) based on, for example, the instruction from the control section 401. Furthermore, the transmission signal generation section 402 generates an uplink data signal based on the instruction from the control section 401. When, for example, the downlink control signal notified from the radio base station 10 includes a UL grant, the transmission signal generation section 402 is instructed by the control section 401 to generate an uplink data signal.

The mapping section 403 maps the uplink signal generated by the transmission signal generation section 402, on a radio resource based on the instruction from the control section 401, and outputs the uplink signal to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiments illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 13:
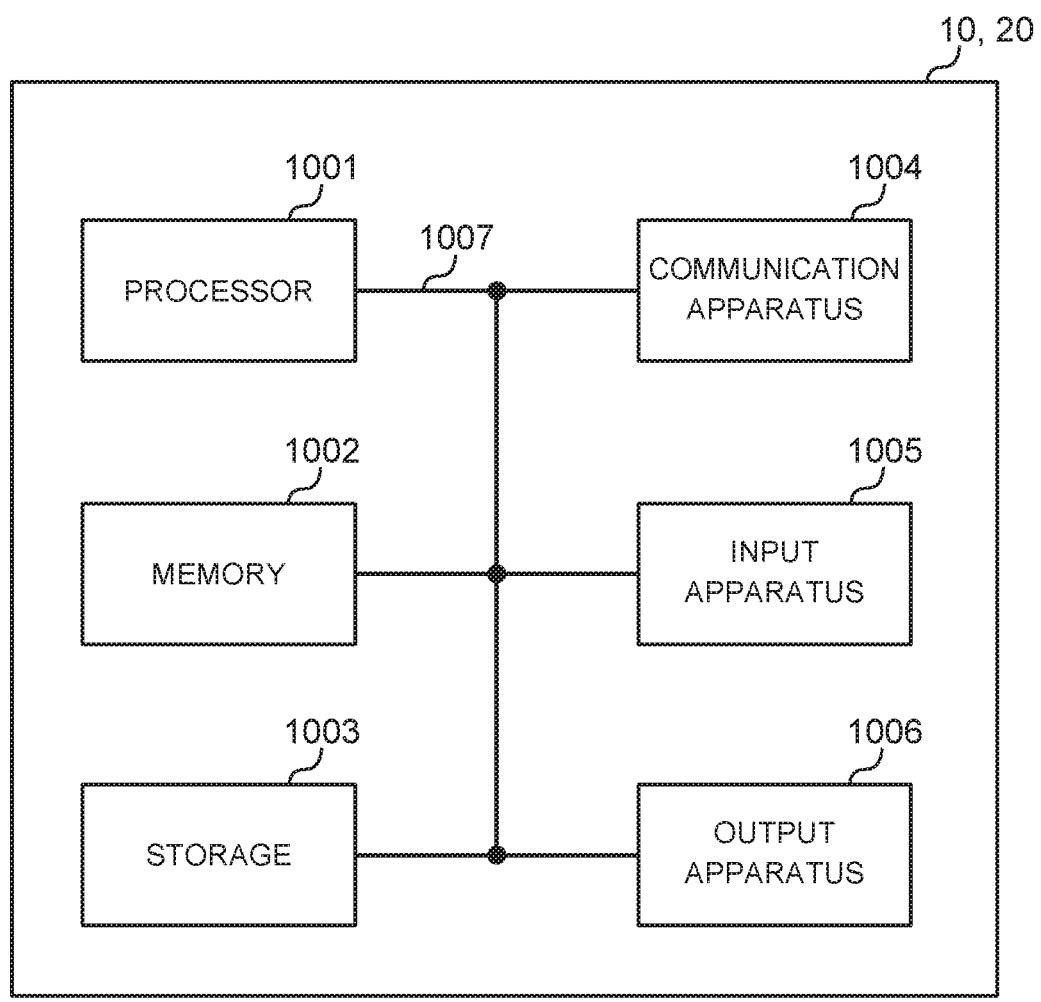
FIG. 13 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 13 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 13 or may be configured without including part of the apparatuses.

For example, FIG. 13 illustrates the only one processor 1001. However, there may be a plurality of processors. Furthermore, processing may be executed by one processor or may be executed by one or more processors concurrently, successively or by using another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmitting/receiving sections 103 (203) and communication path interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are by no means restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspects/embodiments described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only explicitly but also implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency-domains, microwave domains and/or (both of visible and invisible) light domains in some non-restrictive and incomprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an XOR.

The present invention has been described in detail above. However, it is obvious for a person skilled in the art that the present invention is not limited to the embodiments described in this description. The present invention can be carried out as modified and changed aspects without departing from the gist and the scope of the present invention defined based on the recitation of the claims. Accordingly, the disclosure of this description intends for exemplary explanation, and does not bring any restrictive meaning to the present invention.

The invention claimed is:

1. A terminal comprising:
a processor that, by selecting a UE specific search space set after initially selecting a UE common search space set, determines downlink control channel candidates to be monitored, such that a number of the determined downlink control channel candidates does not exceed a maximum value of a number of downlink control channel candidates monitored per slot; and
a receiver that monitors the determined downlink control channel candidates.

2. A terminal according to claim 1, wherein, when selecting the UE specific search space set, the processor controls to select a UE specific search space set having a smallest index among a plurality of UE specific search space sets in ascending order.

3. A terminal according to claim 1, wherein the maximum value is based on a subcarrier spacing.

4. A radio communication method for a terminal, comprising:
by selecting a UE specific search space set after initially selecting a UE common search space set, determining downlink control channel candidates to be monitored, such that a number of the determined downlink control channel candidates does not exceed a maximum value of a number of downlink control channel candidates monitored per slot; and
monitoring the determined downlink control channel candidates.

5. A system comprising a terminal and a base station, wherein:
the terminal comprises:
a processor that, by selecting a UE specific search space set after initially selecting a UE common search space set, determines downlink control channel candidates to be monitored, such that a number of the determined downlink control channel candidates does not exceed a maximum value of a number of downlink control channel candidates monitored per slot; and
a receiver that monitors the determined downlink control channel candidates; and
the base station comprises:
a transmitter that transmits the downlink control channel candidates.

* * * * *